US00RE45793E

(19) United States
(12) Reissued Patent
Jawa et al.

(10) Patent Number: US RE45,793 E
(45) Date of Reissued Patent: Nov. 3, 2015

(54) ACCESSING DIGITAL MEDIA

(75) Inventors: Amandeep Jawa, San Francisco, CA (US); Jeffrey L. Robbin, Los Altos, CA (US); David Heller, Los Altos, CA (US)

(73) Assignee: Apple Inc., Cupertino, CA (US)

(21) Appl. No.: 13/445,791

(22) Filed: Apr. 12, 2012

Related U.S. Patent Documents

Reissue of:
(64) Patent No.: 7,698,297
Issued: Apr. 13, 2010
Appl. No.: 10/799,412
Filed: Mar. 12, 2004

U.S. Applications:
(62) Division of application No. 10/423,638, filed on Apr. 25, 2003, now Pat. No. 6,728,729.

(51) Int. Cl.
*G06F 17/00* (2006.01)
*G06F 17/30* (2006.01)

(52) U.S. Cl.
CPC ..... *G06F 17/30017* (2013.01)

(58) Field of Classification Search
CPC ..... G06F 17/30017
USPC ..... 707/610, 770
See application file for complete search history.

(56) References Cited

U.S. PATENT DOCUMENTS

| | | | | |
|---|---|---|---|---|
| 5,920,856 | A | 7/1999 | Syeda-Mahmood | |
| 5,983,218 | A | 11/1999 | Syeda-Mahmood | |
| 6,243,713 | B1 | 6/2001 | Nelson et al. | |
| 6,374,260 | B1 * | 4/2002 | Hoffert et al. | 707/104.1 |
| 6,498,897 | B1 * | 12/2002 | Nelson et al. | 386/125 |
| 6,505,160 | B1 * | 1/2003 | Levy et al. | 704/270 |
| 6,523,022 | B1 | 2/2003 | Hobbs | |
| 6,587,127 | B1 * | 7/2003 | Leeke et al. | 715/765 |
| 6,653,545 | B2 * | 11/2003 | Redmann et al. | 84/615 |
| 6,662,231 | B1 * | 12/2003 | Drosset et al. | 709/229 |
| 6,697,800 | B1 * | 2/2004 | Jannink et al. | 707/5 |
| 6,728,729 | B1 | 4/2004 | Jawa et al. | |
| 6,735,628 | B2 * | 5/2004 | Eyal | 709/223 |

(Continued)

FOREIGN PATENT DOCUMENTS

| | | |
|---|---|---|
| EP | 1283487 A3 | 2/2003 |
| JP | 11-32070 | 2/1999 |

(Continued)

OTHER PUBLICATIONS

"iHam on iRye: 2.0—VersionTracker," downloaded from: http://www.versiontracker.com/dyn/moreinfo/macosx/13021 on Nov. 12, 2003, 3 pages.

(Continued)

*Primary Examiner* — Miranda Le
(74) *Attorney, Agent, or Firm* — Novak Druce Connolly Bove + Quigg LLP

(57) ABSTRACT

Method and apparatus for accessing media across networks. The present invention generally allows for media to be provided across a network. A client requests media information from a server so the client can create a local representation of the server's database. The client is then able to manage the media information locally. When the client selects the desired media, it requests the selection from across the network. The server then delivers the selected media.

33 Claims, 11 Drawing Sheets

(56) References Cited

U.S. PATENT DOCUMENTS

| | | | | |
|---|---|---|---|---|
| 6,741,980 | B1 * | 5/2004 | Langseth et al. | 707/2 |
| 6,775,687 | B1 * | 8/2004 | Binding et al. | 709/203 |
| 6,829,368 | B2 * | 12/2004 | Meyer et al. | 382/100 |
| 6,865,600 | B1 * | 3/2005 | Brydon et al. | 709/219 |
| 6,941,324 | B2 * | 9/2005 | Plastina et al. | 707/104.1 |
| 6,947,182 | B1 * | 9/2005 | Kumagai | 358/402 |
| 6,947,959 | B1 * | 9/2005 | Gill | 715/501.1 |
| 6,976,028 | B2 * | 12/2005 | Fenton et al. | 707/102 |
| 6,987,221 | B2 * | 1/2006 | Platt | 84/601 |
| 7,024,485 | B2 * | 4/2006 | Dunning et al. | 709/232 |
| 7,054,888 | B2 * | 5/2006 | LaChapelle et al. | 707/104.1 |
| 7,065,342 | B1 * | 6/2006 | Rolf | 455/412.1 |
| 7,073,130 | B2 * | 7/2006 | Novak et al. | 715/744 |
| 7,080,030 | B2 * | 7/2006 | Eglen et al. | 705/26 |
| 7,099,685 | B2 * | 8/2006 | Park et al. | 455/550.1 |
| 7,117,453 | B2 * | 10/2006 | Drucker et al. | 715/833 |
| 7,184,976 | B1 * | 2/2007 | Kumagai | 705/32 |
| 7,213,228 | B2 * | 5/2007 | Putterman et al. | 717/109 |
| 7,295,995 | B1 * | 11/2007 | York et al. | 705/26 |
| 7,698,297 | B2 | 4/2010 | Jawa et al. | |
| 2001/0042107 | A1 | 11/2001 | Palm | |
| 2002/0062252 | A1 | 5/2002 | Van Zoest et al. | |
| 2002/0082901 | A1 * | 6/2002 | Dunning et al. | 705/10 |
| 2002/0101444 | A1 * | 8/2002 | Novak et al. | 345/744 |
| 2002/0134220 | A1 * | 9/2002 | Yamane et al. | 84/609 |
| 2002/0147683 | A1 * | 10/2002 | Capobianco et al. | 705/41 |
| 2002/0183042 | A1 * | 12/2002 | Thornton | 455/412 |
| 2003/0018709 | A1 * | 1/2003 | Schrempp et al. | 709/203 |
| 2003/0061273 | A1 * | 3/2003 | Hayduk | 709/203 |
| 2003/0140313 | A1 * | 7/2003 | Smith | 715/514 |
| 2003/0159566 | A1 * | 8/2003 | Sater et al. | 84/615 |
| 2003/0174819 | A1 * | 9/2003 | Su et al. | 379/90.01 |
| 2004/0002943 | A1 * | 1/2004 | Merrill et al. | 707/1 |
| 2004/0015519 | A1 * | 1/2004 | Maeda | 707/200 |
| 2004/0024580 | A1 * | 2/2004 | Salmonsen et al. | 703/27 |
| 2004/0060070 | A1 * | 3/2004 | Mizushima | 725/110 |
| 2004/0078357 | A1 * | 4/2004 | LaChapelle et al. | 707/2 |
| 2004/0091235 | A1 * | 5/2004 | Gutta | 386/46 |
| 2004/0148362 | A1 * | 7/2004 | Friedman | 709/217 |
| 2004/0192358 | A1 * | 9/2004 | Lai et al. | 455/466 |
| 2004/0204124 | A1 * | 10/2004 | Campbell | 455/566 |
| 2004/0214551 | A1 * | 10/2004 | Kim | 455/412.1 |
| 2004/0243700 | A1 * | 12/2004 | Weast | 709/224 |
| 2006/0010075 | A1 * | 1/2006 | Wolf | 705/57 |
| 2006/0059231 | A1 * | 3/2006 | Takatori et al. | 709/206 |

FOREIGN PATENT DOCUMENTS

| | | |
|---|---|---|
| JP | 2000-348052 | 12/2000 |
| JP | 2001-318949 | 11/2001 |
| JP | 2003-085893 | 3/2003 |

OTHER PUBLICATIONS

Searchware Solutions, "iHam on iRye 2.0 Documentation," http://www.swssoftware.com, 10 pages.

"Slim Devices, Product Information: Overview," downloaded from http://www.slimdevices.com/pi_overview.html, 2004, 2 pages.

Written Opinion of the International Searching Authority dated Jan. 28, 2005 issued in International Application No. PCT/US2004/011621.

"Apache: The Definitive Guide," Feb. 1999, O'Reilly & Associates.

"Apple Introduces iTunes—World's Best and Easiest To Use Jukebox Software," Macworld Expo, San Francisco, Jan. 9, 2001, downloaded from http://www.apple.com/pr/library/2001/jan/09itunes.html, on Jul. 10, 2002, 2 pages.

iTunes, Playlist Related Help Screens, iTunes v1.0, Apple Computer, Inc., Jan. 2001.

"Apple Announces iTunes 2," Press Release, Apple Computer, Inc., Oct. 23, 2001, downloaded from: http://www.apple.com/pr/library/2001/oct/23itunes.html, on Jul. 10, 2002, 2 pages.

Specification Sheet, iTunes 2, Apple Computer, Inc., Oct. 31, 2001.

iTunes 2, Playlist Related Help Screens, iTunes v2.0, Apple Computer Inc., Oct. 23, 2001.

SoundJam MP Plus, Representative Screens, published by Casady & Greene, Inc., Salinas, CA, 2000.

"SoundJam MP Plus Manual, version 2.0"—MP3 Player and Encoder for Macintosh by Jeffrey Robbin, Bill Kincaid and Dave Heller, manual by Tom Negrino, published by Casady & Greene, Inc., 2000.

"WWDC 2002 Keynote," May 6, 2002, downloaded from: http://www.digitalmedievalist.com/it/archive/000028.html on Nov. 12, 2003, 3 pages.

"Review: SoundJam MP Plus 2.5.1," Daniel Chvatik, Oct. 2000, downloaded from: http://www.atpm.com/6.10/soundjam.shtml on Nov. 12, 2003, 8 pages.

"iCommune—Share your music over a network," downloaded from http://www.icommune.sourceforge.net/ on Nov. 12, 2003, 1 page.

Partial European Search Report from European Patent Office for European Patent Application No. 07012976.2 dated Nov. 2, 2007.

Debique et al., "ContentDirectory: 1 Service Template for Universal Plug and Play", Standardized Device Control Protocol Document of the UPNP Forum, Microsoft, version 1.01 Jun. 25, 2002, pp. 1-89.

Ritchie et al., "UPnP AV Architecture: 0.83", Design Document Microsoft, Jun. 12, 2002, pp. 1-22.

Office Action from Chinese Patent Office for Chinese Patent Application No. 200480008880.1 dated Nov. 23, 2007.

Office Action Chinese Patent Office Chinese, Patent Application No. 200480008880.1, dated Nov. 28, 2008 (with translation).

Notification of Reason for Rejection, Japanese Patent Office, Japanese Patent Application No. 2008-29463, dated Sep. 16, 2008 (with translation).

Ikeda, Fuyuhiko, "Mac People", vol. 8, No. 20, ASCII Corporation, Japan, Oct. 15, 2002, pp. 48-51.

Notification of Reason for Rejection, Japanese Patent Office, Japanese Patent Application No. 2002-510066, dated Apr. 1, 2008 (with translation).

Office Action, European Patent Office, Patent Application No. 04760262.8, dated May 5, 2006.

"iCommune 2.0a1," Product Information, 2003, 4 pages.

"Squeezebox—The wireless MP3 player for your digital stereo" downloaded from http://www.slimdevices.com/downloads/squeezebox.pdf, 2003, 2 pages.

Notification of Reason for Rejection, Japanese Patent Office, Japanese Patent Application No. 2008-29463, dated Apr. 6, 2009 (with translation).

Notification of the Third Office Action for Chinese Patent Application No. 200480008880.1, mailed Mar. 13, 2009.

Office Action, European Patent Office, Patent Application No. 04760262.8, dated Feb. 24, 2009.

European Search Report for European Patent Application No. 07012976.2 dated Jan. 22, 2008.

Office Action, European Patent Office, Patent Application No. 07012976.2, dated Feb. 24, 2009.

Office Action for Japanese Patent Application No. 2008/29463 dated Oct. 20, 2009.

* cited by examiner

ACCESSING DIGITAL MEDIA

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

This application is a divisional of U.S. application Ser. No. 10/423,638 entitled "ACCESSING MEDIA ACROSS NETWORK," filed on Apr. 25, 2003 now U.S. Pat. No. 6,728,729 from which priority under 35 U.S.C. §120 is claimed, and which is incorporated herein in its entirety and for all purposes.

BACKGROUND OF THE INVENTION

1. Field of the Invention

The present invention relates to digital media and, more particularly, to accessing digital media across networks.

2. Description of the Related Art

The ability of computers to be able to share information is of utmost importance in the information age. Networks are the mechanism by which computers are able to communicate with one another. Generally, devices that provide resources are called servers and devices that utilize those resources are called clients. Depending upon the type of network, a device might be dedicated to one type of task or might act as both a client and a server, depending upon whether it is giving or requesting resources.

Increasingly, the types of resources that people want to share are entertainment-related. Specifically, music, movies, pictures, and print are all types of entertainment-related media that someone might want to access from across a network. For example, although a music library may reside on a family computer in the den, the media owner may want to listen to the music in the living room.

However, sharing media data can be a network-intensive process. People have devoted significant resources to both reducing the load on networks and increasing the capability of networks to handle large data transfers. Due to advances in compression technology and network bandwidth, the throughput of information through networks has increased dramatically over the years.

Although the described technologies work well in many applications, there are continuing efforts to further improve the ability to transfer digital media.

SUMMARY OF THE INVENTION

The present invention provides a method of retrieving media across a network. First, a client connects to a network that includes a server. The server includes at least one media database that has media and associated media information. The client then queries the server for at least a portion of the media information and then receives media information responsive to the query. The client then uses a client-side media management system to manage the received media information. Management of the received media information includes selecting media. The client then requests the selected media from across the network and, in response to the request, receives the requested media.

In another aspect, a client queries the server for server information and capabilities after connecting to the network. The client then receives a response that identifies the server and informs the client as to its capabilities. After receiving the server information, the client queries the server for database enumeration and receives a response that enumerates all databases, how much media is available, and how many media collections are available. After the database identification, the client queries the server for an enumeration of media collections in the database and receives a response that identifies media collections. The client then queries the server for data associated with an identified media collection, the query being capable of requesting a different level of detail than would be given by default. The response to the media collection query identifies data associated with the identified media collection in the requested level of detail. The client then executes the identified media collection, requesting media from the server when the media collection requires the media and receiving the requested media.

In yet another aspect, the invention provides a method of ensuring that a media database representation on a client is current. The server first provides a media database that updates to a current revision indicator whenever the media database is modified. Then, the server receives a request from the client, the request pertaining to the database that includes a client-provided revision indicator. After receiving the request, the server compares the current revision indicator to the client-provided revision indicator. The server then responds to the request with a response that includes at least an identification of the current revision indicator if the client-provided revision indicator did not match the current revision indicator.

BRIEF DESCRIPTION OF THE DRAWINGS

The invention may best be understood by reference to the following description taken in conjunction with the accompanying drawings in which.

It is to be understood that, in the drawings, like reference numerals designate like structural elements. Also, it is understood that the depictions in the figures are not necessarily to scale.

DETAILED DESCRIPTION OF THE PREFERRED EMBODIMENTS

In the following description, numerous specific details are set forth to provide a thorough understanding of the present invention. However, it will be obvious to one skilled in the art that the present invention may be practiced without some or all of these specific details. In other instances, well known process steps have not been described in detail in order to avoid unnecessarily obscuring the present invention.

The present invention generally allows for client machines to access a media database on a server. Both data and metadata on the server describes and organizes the media in various ways and allows the server to manipulate the media. Instead of relying on the server to execute the media management system, the client requests the data and metadata and then uses the information on a local media management system, effectively creating a representation of the server on the client. Once media is selected on the client through the client-side media management system, the client can request the media from the server, and the server can deliver the media to the client.

The invention can support both "thick" and "thin" clients. Thick clients are typically software programs, such as iTunes™ software available from Apple Computer, Inc. of Cupertino, Calif., operating on hardware devices that support full user interface abilities and have considerable processor and memory resources. Thin clients are software programs operating on hardware devices that may have limited user interface abilities and have reduced processing and memory resources. The invention allows for robust control features appropriate for thick clients, but can adapt to minimal control features for thin clients.

Generally, a client will first make a request to determine whether media is available on a server. Then, the client can make a series of requests to create a representation of the media available on the server on the client. The representation contains information about the media available on the server ("media information"). Thick clients can choose to retrieve a complete representation of the server's available media, while thin clients may choose to retrieve a partial representation of the server's available media. After receiving the media information from the server, the client (as instructed by its user) can then search, browse, sort, or otherwise interact with the media information now resident on the client. Further, the client (as instructed by its user) will typically select a media item to be presented (e.g., played). In such a case, the media content for the selected media item is streamed from the server to the client.

In addition, clients can receive notifications from the server when a media database has been changed. Multiple connections can allow a client to use one connection to access media while using another connection to wait for a notification that the database has changed, or to browse media listings.

Figure 1:
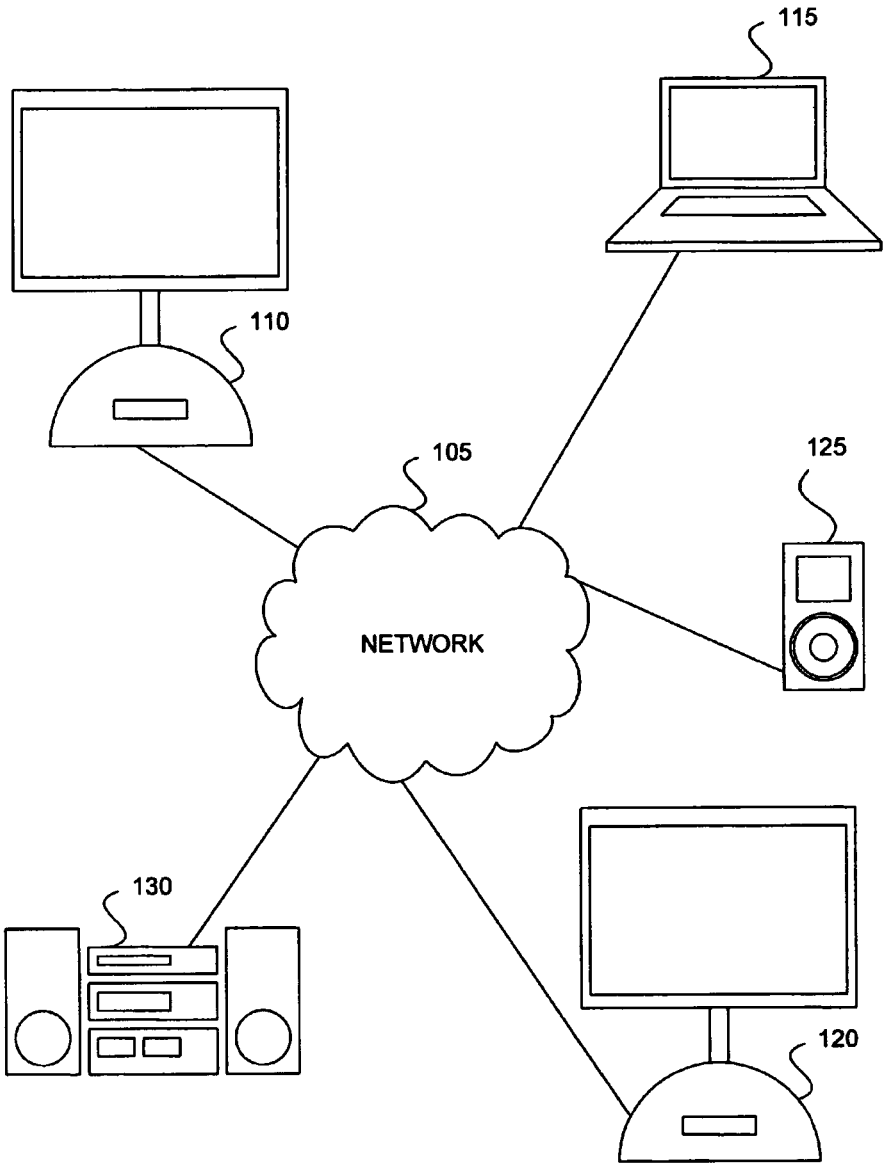
FIG. 1 is a block diagram illustrating an exemplary environment in which the present invention may be implemented.

FIG. 1 is a block diagram illustrating an exemplary environment in which the present invention may be implemented. A network 105 couples a server 110 to various clients 115, 120, 125, and 130. The network 105 can generally be a data network, such as a LAN, WAN or the Internet. The server 110 may or may not be a dedicated device. In the example shown in FIG. 1, the server 110 is a general purpose computer. The various clients 115, 120, 125, and 130 can be thick or thin clients, with varying levels of processing power. Clients may include portable computers 115, desktop computers 120, specialized devices such as iPods™ 125 available from Apple Computer, Inc. of Cupertino, Calif., or even network-aware audio/video components 130 that are designed to work across a network 105. The following discussion will, for simplicity, assume only the portable computer client 115 is requesting information from the server 110.

Figure 2:
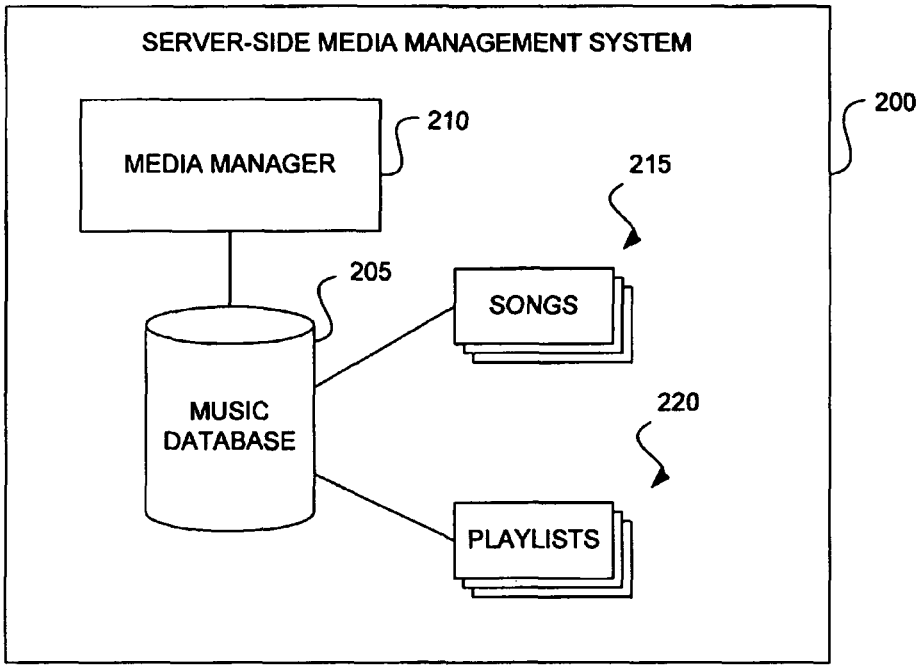
FIG. 2 is a block diagram illustrating an organizational structure of a server-side media management system on the server illustrated in FIG. 1.

FIG. 2 is a block diagram illustrating an organizational structure of a server-side media management system 200 on the server 110. The server-side media management system 200 includes a media manager 210 and a music database 205. The media manager 210 controls access to the music database 205. More particularly, the media manager 210 receives requests from the client 115, accesses the music database, and returns responses to the client 115.

The music database 205 has a number of records 215 and 220 that are used to classify, identify and/or describe media (i.e., media items) in the music database 205. For simplicity, the following discussion will assume the digital media contained on the server 110 only contains music files that can be streamed over the network 105. It should be appreciated that any reference to "songs" or "music" made in this document could be generalized to any form of digital media, which can include sound files, picture data, movies, text files or any other types of media that can be digitally stored on a computer. Similarly, any reference to "playlists" can be generalized to media collections, including collections of mixed digital media.

The media manager 210 has or can obtain information about the database 205 that may, for example, include the name of the server, the version of the database being used, the type of security that is required, the number of databases available to the server, whether non-standard content codes are supported, whether persistent identification is supported, etc. It should be appreciated by those skilled in the art that the information about the database 205 may exist in a single record file or can be either partially or fully generated on demand, identifying the various pieces of information as needed.

The song records 215 contain metadata about each media item available in the database 205. The metadata might include, for example, the names of songs, an identification number, a persistent identification number, the artist, the album, the size of the song, the format of the song, the required bit rate, and any other appropriate information. Of course, the type of information may depend on the type of media. A video file might additionally have director and producer fields, but may not use the album field. Still pictures would have no need for bit rate information. While some fields may be standard, others may be specific to certain applications. For example, a video signal may have secondary audio program (SAP) information. A mechanism for ensuring clients can properly process non-standard content codes is described in connection with FIG. 4A.

Both an identification number and a persistent identification number can be used. If supported, a persistent identification could be used to access the same information across server restarts. Typically, a server would assign each record a new identification number every time the media management system 200 restarted. However, persistent identification numbers would remain the same for as long as the record is available.

The playlist records 220 contain information about each playlist available in the music database 205. Further, the information for a given playlist can include the identification numbers for each of the songs within the playlist. Playlists are collections of media that may or may not be in any particular order. Users may choose to combine media by genre, mood, artists, audience, or any other meaningful arrangement. While the playlists 220 on the server 110 will usually only include media contained in its own music database 205, there is no reason the playlist records 220 cannot include media or playlists stored on other servers. However, certain non-standard content codes may need to be used, depending upon the implementation of the server-side media management system 200.

Figure 3:
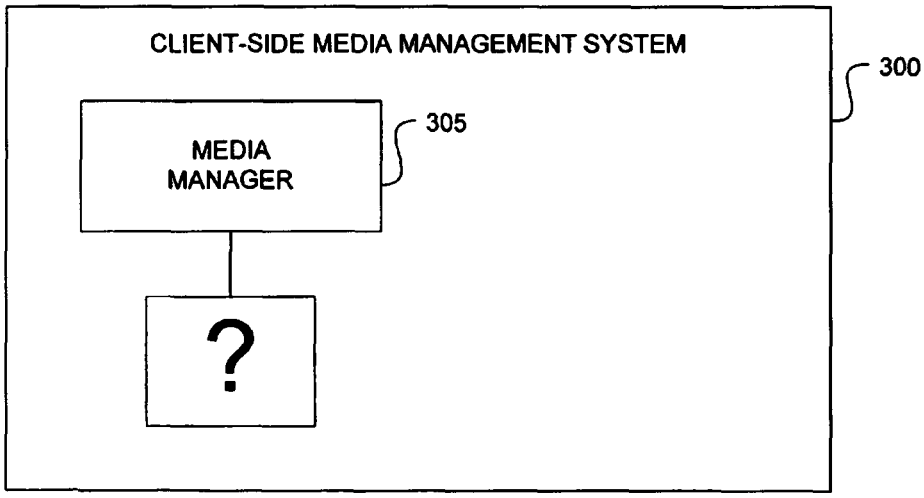
FIG. 3 is a block diagram illustrating an organizational structure of a client-side media management system on the client illustrated in FIG. 1.

FIG. 3 is a block diagram illustrating an organizational structure of a client-side media management system 300 on one of the clients 115. The client-side media management system 300 includes a media manager 305. The media manager 305 interacts with the media manager 210 of the server-side media management system 200 through the network 105 so as to replicate at least a portion of the music database 205 at the server 110 on the client 115. When the client-side media management system 300 first starts, it cannot access media on the server 110 because it does not as yet have any information about what media is available.

Figure 4A:
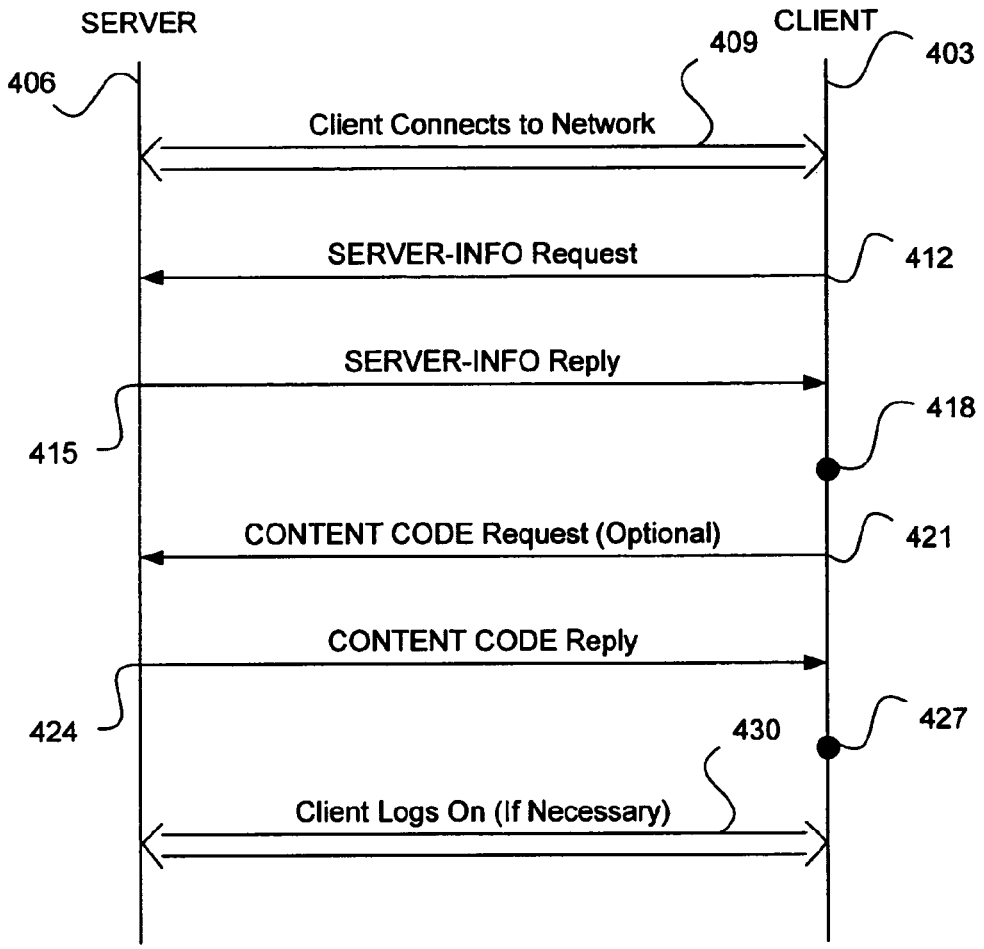
FIG. 4A is a representational control flow diagram illustrating one technique that can be used to determine the features of the server-side media management system illustrated in FIG. 2.

FIG. 4A is a representational control flow diagram illustrating one technique that can be used to determine the features of the server-side media management system 200. Operations performed by the client 115 and the server 110 are represented by corresponding vertical lines 403 and 406. At 409 the client 115 connects to the network 105 and first becomes aware of the server 110. The client 115 can use any connection mechanism that allows it to interact with the network 105. For example, if the client 115 were an iBook™, available from Apple Computer, Inc. of Cupertino, it might use Rendezvous™ networking technology, also available from Apple Computer, Inc. of Cupertino, Calif., in order to automatically configure itself with the network 105. If the client is not aware of the server 110, other mechanisms can be used. For example, a user might manually search for the server 110, or the user might directly enter the address of the server 110.

Once the client 115 is aware of the server 110, it can send a SERVER-INFO request to the server 110 at 412. The SERVER-INFO request is usually used to obtain information from the server prior to attempting any other transactions. If the network 105 uses the TCP/IP protocol, the request could be formatted as an HTTP GET request. The GET request might also allow for additional extensions to be added to the request, enabling, for example, the client 115 to include information about the client-side media management system 300.

At 415 the server responds to the SERVER-INFO request with information describing a series of features supported by or required by the server. The information might, for example, include information about the server-side media management system 200, the number of available databases, whether and what login procedures are required, whether updates are supported, whether persistent identification numbers are supported, whether non-standard content codes are supported, and the protocol version.

The information provided to the client 115 at 415 permits the client-side media management system 300 to understand the capabilities of the server 110. Although the client 115 is able to identify the server 110, the client 115 does not yet have any information about the available media.

If the client 115 determines that the server 110 responded to the SERVER-INFO request with an indication that non-standard content codes are supported at 418, the client 115 can optionally issue a CONTENT CODE request at 421. The CONTENT CODE request is one mechanism by which the client 115 can obtain a list of content codes supported by the server 110 and associated string names mapped thereto.

The inclusion of the string name allows multiple developers to use the same codes for their individualized products. For example, one developer may assign the code "16000" to a feature that allows users to purchase corresponding albums over the network; while another developer may assign the same code to feature that provides users with the lyrics of songs that are being listened to. By allowing a string name to be included, the client 115 can determine whether it can support the content code. Uniqueness of the string name can, for example, be ensured by including the developer's URL as part of the string name.

At 424 the server 110 responds to the CONTENT CODE request the codes and their associated string names. At 427, the client 115 can simply ignore the code/string pairs that it does not recognize. Otherwise, for those code/string pairs that the client 115 does recognize, the client 115 will associate the code with the associated string name.

At 430 the client 115 logs into the server 110. The login procedure might require a user name (or account name) and password so the user of the client can be authenticated. The login procedure is only required if the server 110 requires it. Certain security protocols might require that every future request made by the client 115 include certain parameters such as a session identification number.

Figure 4B:
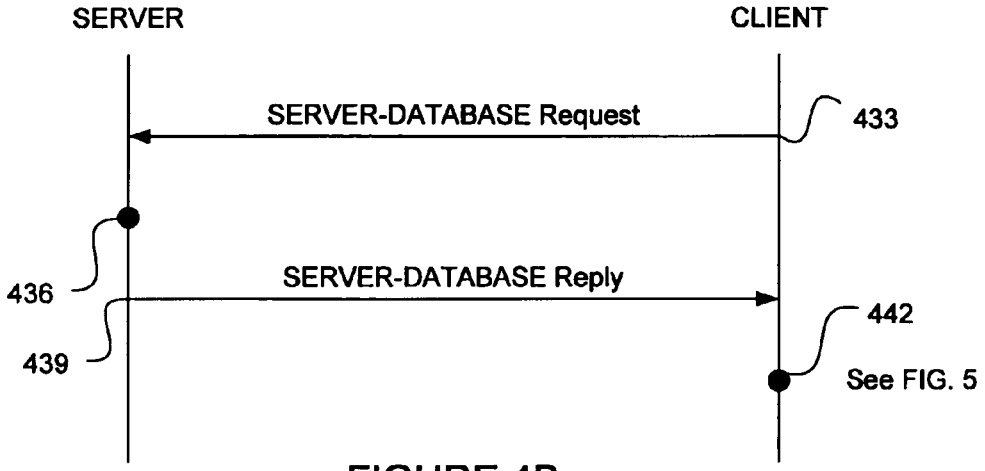
FIG. 4B is a representational control flow diagram illustrating one technique that could be used to enumerate databases of the server-side media management system illustrated in FIG. 2.

Once logged in, the client 115 is ready to begin populating its local representation of the music database 205. FIG. 4B is a representational control flow diagram illustrating one technique that can be used to enumerate databases of the server-side media management system 200. Operations performed by the client 115 and the server 110 are represented by corresponding vertical lines 403 and 406. At 433 the client 115 can issue a SERVER-DATABASE request, which can be used to retrieve the list of all music databases from the server 110. The SERVER-DATABASE request may additionally include an index range and/or a query. Although available to both thick and thin clients, thin clients might use index ranges and/or queries to limit the amount of data contained in each server response.

The index range might be used in any request to constrain the items returned in the response to a subset of the total set of items, based on the position (or index) of the first item and the number of items requested. For example, an index range could be used to request: the second music database from a server, songs 10 through 20 from a music database, the last 5 playlists from a music database, the first 5 songs from a given playlist, or the 42nd song in a music database.

The query might be used in any request to constrain the items returned in the response to a subset of the total set of items, based on the specified criteria. For example, a query could request: songs in a database after a given year; playlists that contain a certain word in their name; songs in a database that do not contain a given word in their name; or some combination thereof.

After processing the SERVER-DATABASE request at 436, the server 110 issues a response at 439. If no index range and/or query was given, the response would contain a complete list of the music databases available at the server 110 together with information about the one or more music databases. The information about each database might, for example, include the database identification number, the persistent database identification number, the name for each database, the numbers of songs, and the number of playlists. With this information, the client-side media management system 300 becomes aware of the general structure of the one or more music databases at the server 110.

Figure 5:
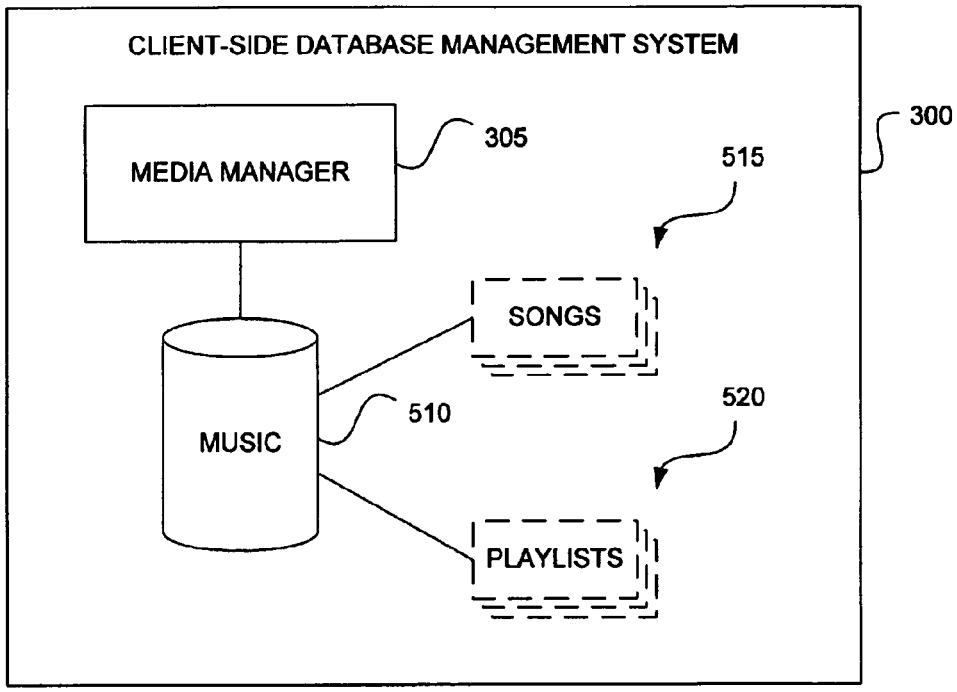
FIG. 5 is a block diagram illustrating an organizational structure of the client-side media management system after receiving a reply to the SERVER-DATABASE request illustrated in FIG. 4B.

FIG. 5 is a block diagram illustrating the organizational structure of the client-side media management system 300 shown in FIG. 3 after receiving a reply to the SERVER-DATABASE request. At 442, the client 115 is able to identify the music database 510, the number of available song records 515, and the number of available playlists 520. Once the general structure of the music database 510 is known, the client 115 can populate its representation using any number of techniques.

Figure 4C:
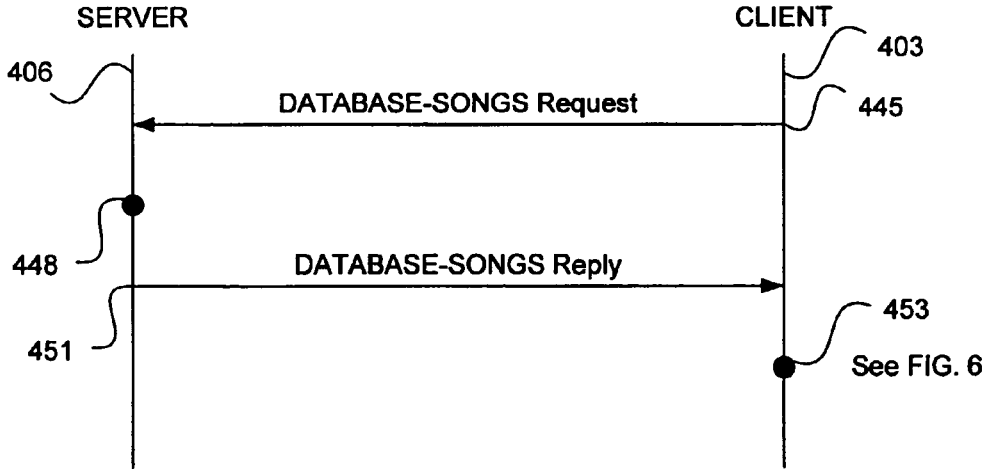
FIG. 4C is a representational control flow diagram illustrating one technique that could be used to populate a song records portion of the client-side media management system illustrated in FIG. 5.

FIG. 4C is a representational control flow diagram illustrating one technique that could be used to populate the song records 515 portion of the client-side media management system 300 for a specific database 510. Operations performed by the client 115 and the server 110 are represented by corresponding vertical lines 403 and 406. At 445 the client issues a DATABASE-SONGS request to obtain metadata about available songs.

A thick client may choose to issue a DATABASE-SONGS request so that it can front load network traffic. Once metadata about a song is received and stored, the client 115 does not need to request that metadata again. Playlists would only need to correctly identify a song (e.g., using the song identification number), and the client-side media management system 300 would be able to associate it with the already-received metadata.

Thin clients may choose to issue an index range, query, metadata field specifier, or skip 445 all together. A metadata field specifier would indicate that only certain metadata fields are desired. Thick clients that use 445 may also choose to use these same index range, query or metadata field specifier techniques. For example, limiting the song metadata request to only songs in a certain genre might be a technique that is used to provide the user with a different user experience.

Figure 4D:
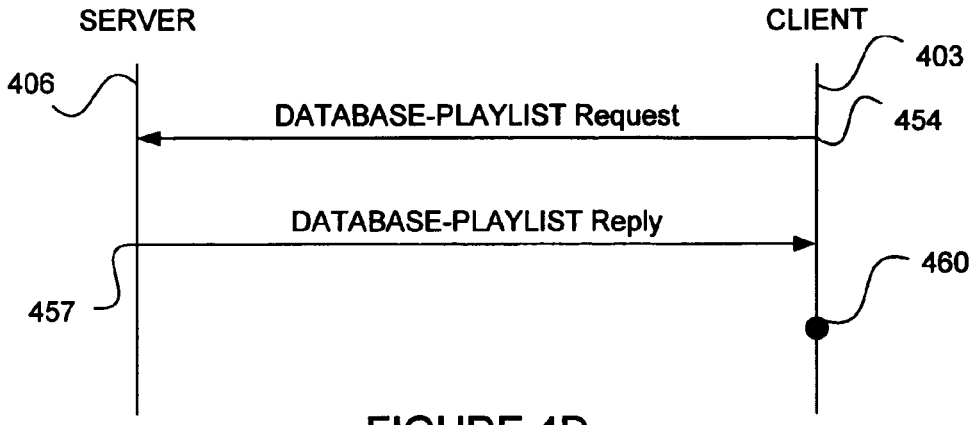
FIG. 4D is a representational control flow diagram illustrating a technique that could be used to enumerate playlists of the server-side media management system illustrated in FIG. 2.
Figure 6:
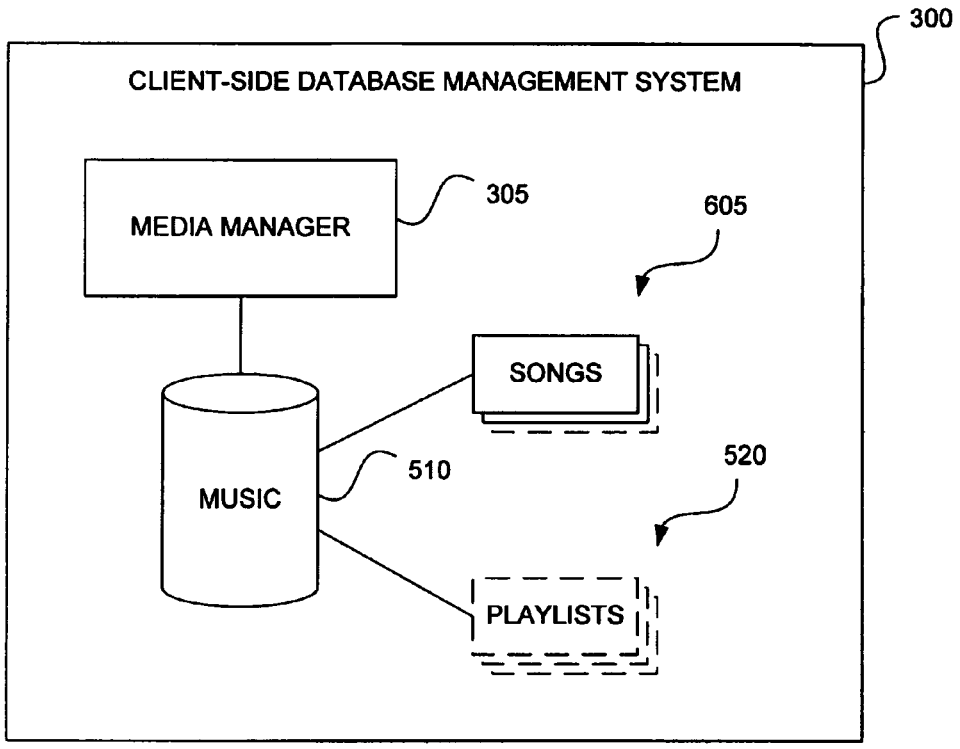
FIG. 6 is a block diagram illustrating an organizational structure of the client-side media management system after receiving a reply to the DATABASE-SONGS request illustrated in FIG. 4C.

The server 110 performs any necessary filtering operations at 448 and then issues a reply at 451. FIG. 6 is a block diagram illustrating the organizational structure of the client-side media management system 300 at 453, after receiving a reply to the DATABASE-SONGS request. The song records 605 may either be a partial or complete representation of the server-side song records 215, having metadata that might, for example, include the names of songs, an identification number, a persistent identification number, the artist, the album, the size of the song, the format of the song, the required bit rate, and any other appropriate information. If the server-side management system 200 had multiple databases, a DATABASE-SONGS request (if used) would need to be issued for each database FIG. 4D is a representational control flow diagram illustrating a technique that could be used to enumerate the playlist records 220 portion of the server-side media management system 200. Operations performed by the client 115 and the server 110 are represented by corresponding vertical lines 403 and 406.

At 454 the client issues a DATABASE-PLAYLIST request to obtain a list of available playlists. Playlists on the server 110 can either be user-identified or generated automatically by the server-side media management system 200. For example, a "base playlist" might be automatically created as a special playlist that contains all the songs in the entire song database 205 while a "John Lennon playlist" might be a user-created collection of songs by John Lennon.

After receiving the DATABASE-PLAYLIST request and performing any necessary filtering operations, the server 110 issues a reply at 457. The reply includes a list of all playlists in the music database 205 and information about those playlists. The information about the playlists might, for example, include identification numbers and/or persistent identification numbers for the playlists, and any other information (e.g., whether the songs in the playlist are in order or can be shuffled) that may have been provided. Multiple DATABASE-PLAYLIST requests may be required to populate multiple databases.

Figure 4E:
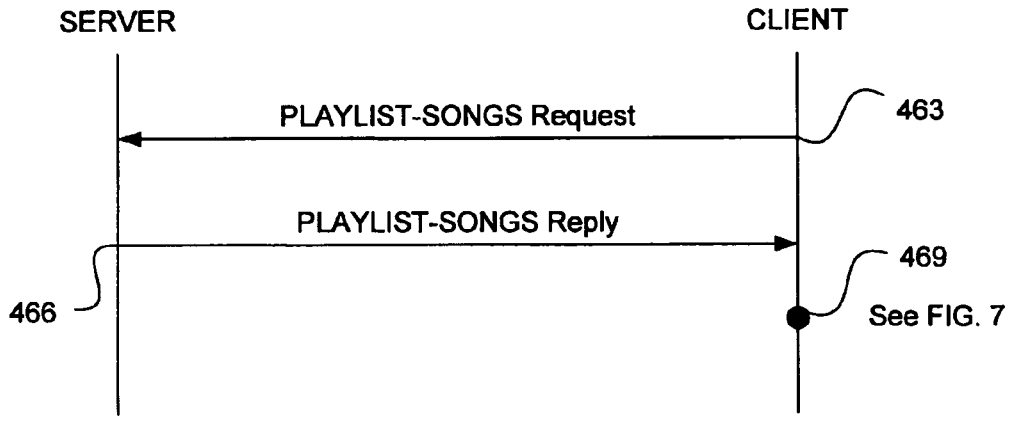
FIG. 4E is a representational control flow diagram illustrating a technique that could be used to populate a playlist records portion of the client-side media management system illustrated in FIG. 6.

FIG. 4E is a representational control flow diagram illustrating a technique that could be used to populate the playlist records 520 portion of the client-side media management system 300. Operations performed by the client 115 and the server 110 are represented by corresponding vertical lines 403 and 406. Once a playlist is identified at 460, the client 115 sends a PLAYLIST-SONGS request for that playlist at 463. Depending upon whether operations 445 through 451 were already performed, the PLAYLIST-SONGS request could additionally request that metadata accompanying each song also be delivered in order to populate the song records 605. Although thick clients that do not have a mechanism for informing the server 110 of already-received song records 605 would run the risk of receiving duplicate song records 605, thin clients that did not retain song records 605 might benefit from requesting song metadata along with each playlist.

Figure 7:
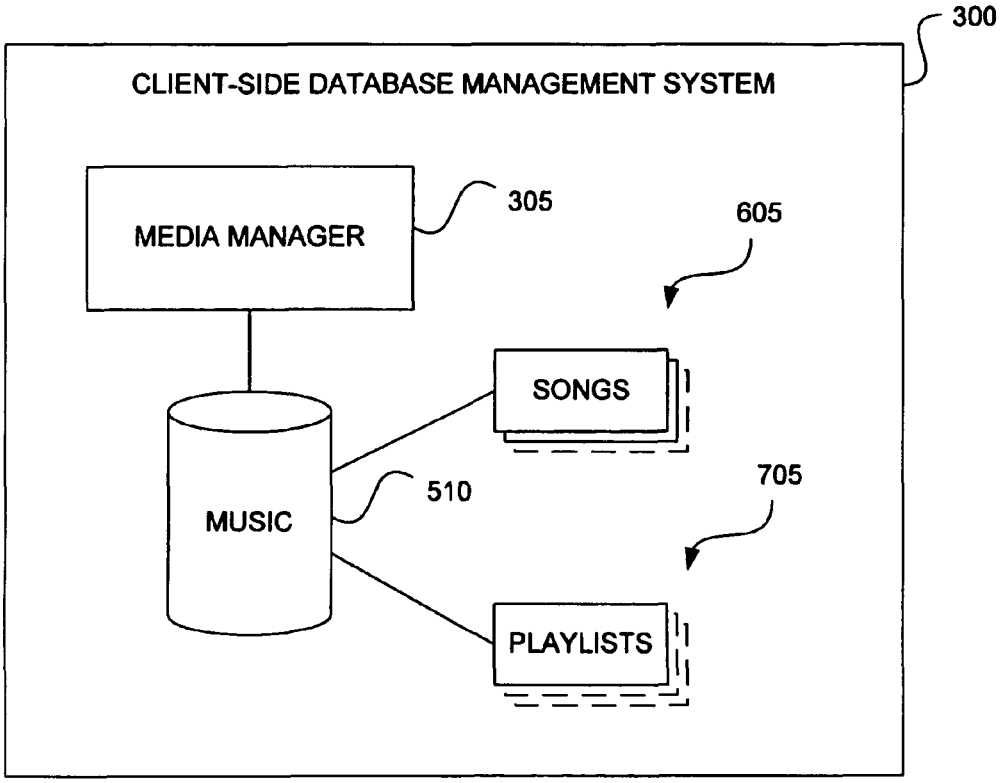
FIG. 7 is a block diagram illustrating an organizational structure of the client-side media management system after receiving a reply to the PLAYLIST-SONGS request illustrated in FIG. 4E.

After receiving the PLAYLIST-SONGS request and performing any necessary filtering operations, the server 110 issues a reply at 466 containing the requested information. FIG. 7 is a block diagram illustrating the organizational structure of the client-side media management system 300 after receiving a reply to the PLAYLIST-SONGS request at 469. Each time the PLAYLIST-SONGS transaction between the client 115 and the server 110 is completed, another playlist record 705 is populated. The playlist record 705 may be a complete or partial representation of the corresponding server-side playlist record 220. Multiple PLAYLIST-SONGS requests may be required to populate multiple playlists.

Figure 4F:
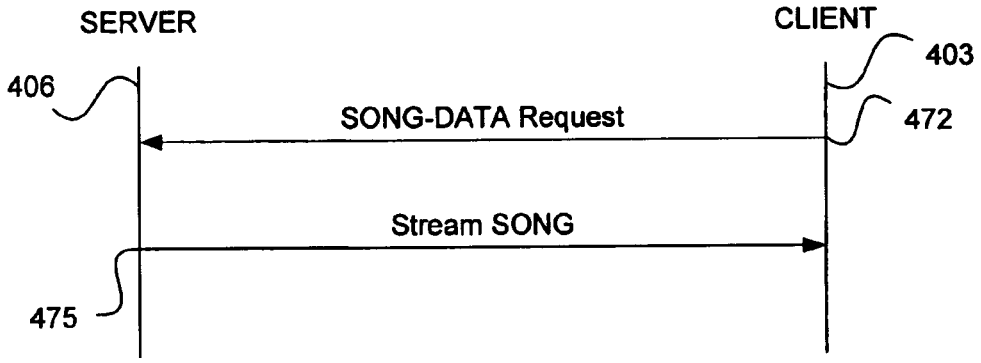
FIG. 4F is a representational control flow diagram illustrating a technique that could be used to retrieve a song from a song database once a song is selected from the client-side media management system illustrated in FIG. 7.

FIG. 4F is a representational control flow diagram illustrating a technique that could be used to retrieve a song from the song database 205 once a song is selected. Operations performed by the client 115 and the server 110 are represented by corresponding vertical lines 403 and 406.

At 472 the client 115 issues a SONG-DATA request to retrieve the song data from the server 110. If a single song is stored in multiple formats on the server 100, the SONG-DATA request could include a format identifier. The format identifier could specify that the song is requested in, for example, MPEG 3 encoded data ("mp3"), MPEG 4 advanced audio coding ("m4a") audio interchange file format ("aiff"), or Windows sound file ("wav"). At 475 the server 110 delivers the audio file to the client 115. In one embodiment, the server 110 will stream the song by appending song data to an http header, therefore making the client 115 responsible for parsing the data as is appropriate for playing the song at the client 115.

The preceding description assumes no mechanism is used to update the client 115 if the data on the server-side media management system 200 is modified during a session. For example, a client-side representation of a playlist 705 may not accurately represent the latest version of the corresponding server-side playlist 220.

Figure 8:
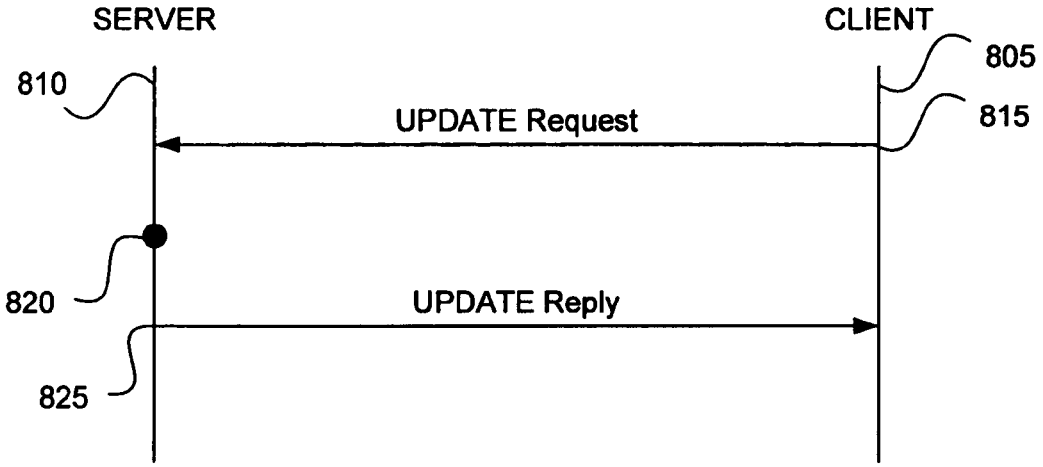
FIG. 8 is a representational control flow diagram illustrating one technique that could be used to ensure the client and the server illustrated in FIG. 1 are synchronized.

FIG. 8 is a representational control flow diagram illustrating one technique that could be used to ensure the client 115 and the server 110 are synchronized. Operations performed by the client 115 and the server 110 are represented by corresponding vertical lines 805 and 810.

At 815 the client 115 issues an UPDATE request to retrieve the media data from the server 110. The UPDATE request can be a flag that informs the server 110 that the client 115 wants to be informed when data on the server 110 (e.g., music database 205) changes. In one embodiment, the flag is a revision indicator, such as a revision number or a time-stamp.

At 820 the server 110 processes the UPDATE request. In one embodiment, the server 110 will not respond to the UPDATE request until the server's music database has changed relative to the client's representation for that music database. If a revision number was used at 815, the server 110 compares the revision number provided by the client 115 with the current revision number to determine if a change was made. The revision number of the server 110 represents the version of the music database 205 at the server 110. Any subsequent changes to records 215 or 220 may cause the server 110 to increment its revision number by one. Depending upon the requirements of the system, a group of changes to records 215 or 220 may be batched so that the revision number only increments once. Batching may be performed by standard techniques, including by operation (e.g., adding files as a group to the server), by time (e.g., waiting a certain period of time after the last change has been made to ensure no other changes will be made) or by number of operations (e.g., changing the revision number after a certain number of changes).

Once the server 110 determines that the revision number provided by the client no longer equals the current revision number, a reply is issued at 825. In one embodiment, the reply will contain the server's current revision number. Although the server 110 could then the continue to monitor for changes in the server's current revision number, the client 115 might re-issue a new UPDATE request with the server's current revision number, essentially repeating operation 815 with the updated revision number. Some systems might have the client 115 always start with a client-generated revision number of "1" and the server 110 always start with a revision number "2" in order to force the server 110 to issue an UPDATE reply the first time it receives an UPDATE request. Such an approach can provide the client 115 with an impetus for populating its local representation of the music database 205 with a SERVER-DATABASE request (see FIG. 4B at 433). Additionally, an UPDATE reply might also be used to notify a client 115 that the server is about to terminate connection (possibly due to timeout or server shutdown), perhaps by issuing a current revision number of 0.

In addition to the UPDATE request, the client 115 could also include a revision number field in any of the requests 433, 445, 454, and 463. The server 110 would then, on a request-by-request basis, check the revision number provided with the requests with the revision number for that particular request. If the revision numbers did not match, the server 110 would issue an UPDATE reply, specifying the current revision number and perhaps the corresponding reply. Otherwise, the server 110 would comply with the request as previously described.

In one embodiment, the database requests 433, 445, 454, and 463 would additionally support incremental updating in order to reduce network traffic (and to improve user experience through greater responsiveness). Incremental updates would allow the client to request only the changes from a historical revision number to a current revision number. If, for example, the client 115 had populated its playlists records 705 with information from revision "5," and then the client is notified by the server 110 that the latest revision is "8," the client can issue a new PLAYLIST-SONGS request 463, requesting only the information that has changed from revision "5" to revision "8." As long as the server 110 maintains or has access to a historical record of modifications from each revision number, it would be able to comply with the incremental request.

However, an optimization might allow for the server 110 to determine whether complying with the incremental request would actually be more efficient than re-sending the entire reply. In certain circumstances (e.g., when more than half of the songs in the playlist were deleted), it would use less network resources to reply with a full PLAYLIST-SONGS reply 466 instead of an incremental reply. However, when the PLAYLIST-SONGS reply 466 provides a full reply, the reply would advantageously include an indication that the data does not represent an incremental update, so the client 115 will be able to properly handle the information.

Generally, the techniques of the present invention may be implemented on software and/or hardware. For example, they can be implemented in an operating system, in a separate user process, in a library package bound into network applications, or on a specially constructed machine. In a specific embodiment of this invention, the technique of the present invention is implemented in software such as an operating system and/or in an application program running on the operating system.

A software or software/hardware hybrid implementation of the techniques of this invention may be implemented on a general-purpose programmable machine selectively activated or reconfigured by a computer program stored in memory. In an alternative embodiment, the techniques of this invention may be implemented on a general-purpose network host machine such as a personal computer, workstation or server. Further, the invention may be at least partially implemented on a general-purpose computing device.

Figure 9:
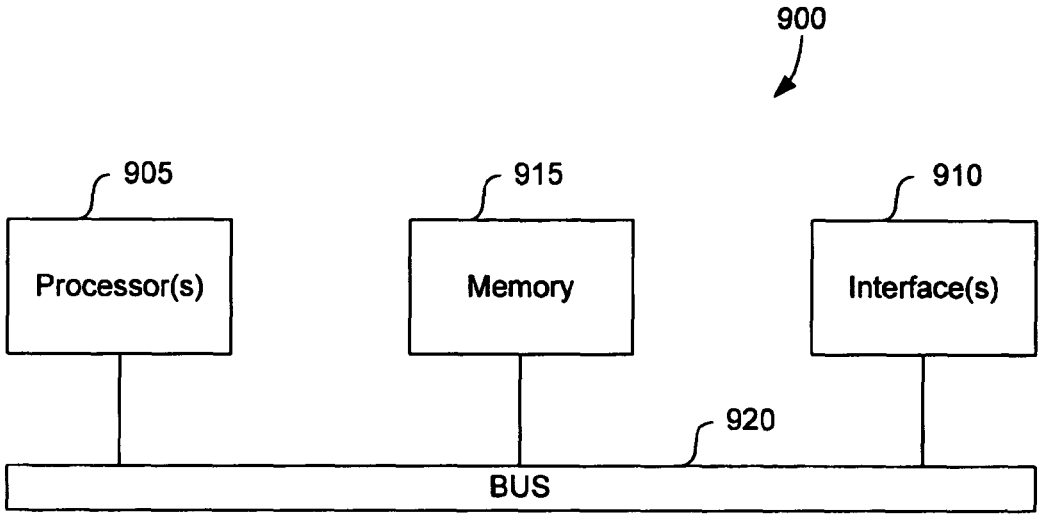
FIG. 9 is a diagram illustrating an exemplary computing device in which various embodiments of the invention may be implemented.

Referring now to FIG. 9, a computing device 900 suitable for implementing the techniques of the present invention includes a master central processing unit (CPU) 905, interfaces 910, memory 915 and a bus 920. When acting under the control of appropriate software or firmware, the CPU 905 may be responsible for implementing specific functions associated with the functions of a desired computing device. The CPU 905 preferably accomplishes all these functions under the control of software including an operating system (e.g., Mac OS X), and any appropriate applications software (e.g., iTunes).

CPU 905 may include one or more processors such as those from the Motorola family of microprocessors or the MIPS family of microprocessors. In an alternative embodiment, the processor is specially designed hardware for controlling the operations of computing device 900.

The interfaces 910 are typically provided as interface cards. Generally, they control the sending and receiving of data packets over the network and sometimes support other peripherals used with the computing device 900. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces, ASI interfaces, DHEI interfaces and the like. Generally, these interfaces may include ports appropriate for communication with the appropriate media. In some cases, they may also include an independent processor and, in some instances, volatile RAM.

Regardless of computing device's configuration, it may employ one or more memories or memory modules (such as, for example, the memory 915) configured to store data, program instructions and/or other information relating to the functionality of the techniques described herein. The program instructions may control the operation of an operating system and/or one or more applications, for example.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store program instructions, such as read-only memory devices (ROM) and random access memory (RAM). Examples of program instructions include both machine code, such as produced by a compiler, and higher level code that may be executed by the computer (e.g., using an interpreter).

Although illustrative embodiments and applications of this invention are shown and described herein, many variations and modifications are possible which remain within the concept, scope, and spirit of the invention, and these variations would become clear to those of ordinary skill in the art after perusal of this application. Accordingly, the present embodiments are to be considered as illustrative and not restrictive, and the invention is not to be limited to the details given herein, but may be modified within the scope and equivalents of the appended claims.

What is claimed is:

1. A method of retrieving digital media comprising:

querying a server for database enumeration *via a client device to yield a first query*;

receiving a response to the database enumeration query that includes at least information about [at least one] *a remote* digital media database coupled to the server, wherein the information about the [at least one] *remote* digital media database includes at least metadata about one or more remote records within the [at least one] *remote* digital media database, and wherein the one or more remote records pertain to one or more of digital media, digital media metadata or media collection data;

using the metadata to [effectively] provide a first representation of the one or more remote records *at the client device*;

querying, *via the client device,* the server for information [required] to populate one or more local records associated with the metadata after receiving the metadata *to yield a second query, wherein the one or more local records are part of a local database at the client device*;

receiving the information [required] to populate the one or more local records associated with the metadata in response to the [querying of the server] *second query*;

populating the one or more local records *at the local database on the client device* after receiving the information [required] to populate the one or more local records, thereby [effectively] providing one or more *local* populated records based on the metadata associated with the one or more remote records;

*querying the remote database for information to update the local populated records at the local database;* using the one or more *local* populated records to [effectively] provide a second representation of the one or more remote records; and subsequently retrieving digital media associated with at least one of the *one or more local* populated records,

[wherein the one or more local records are part of a local database, and] wherein said populating of the one or more local records operates to replicate at least a portion of the *remote* digital media database to the local database, and wherein the first representation provides a first level of detail with respect to the one or more remote records, wherein the second representation provides a second level of detail with respect to the one or more remote records, and wherein the second level of detail represents the one or more records in greater detail than the first level of detail.

2. The method of claim 1, wherein the remote records pertain to both digital media metadata and media collections and multiple queries are [required] to populate the local records associated with the metadata.

3. The method of claim 1 further comprising using a local database management system to manage the information contained in the local records of the local database, the local records including media collection data records and digital media metadata records.

4. The method of claim 1, wherein the server is a remote device accessible across a network, and wherein said method further comprises:

querying the server for media collection enumeration with respect to the at least one digital media database; and receiving a response to the media collection enumeration query that includes at least information about one or more media collections.

5. The method of claim 1 wherein, said retrieving of the digital media comprises:

requesting media from across a network; and receiving the requested media across the network.

6. The method of claim 5 further comprising presenting the received media at a client device, wherein presenting the received media includes playing the media for a user.

7. A method as recited in claim 1, wherein the one or more populated records effectively provide a representation of the one or more remote records.

8. A method as recited in claim 1, wherein the first representation represents the one or more remote records in accordance with a first aspect of representation; and wherein the second representation represents the one or more remote records in accordance with a second aspect of representation that is different than the first aspect of representation.

9. A method as recited in claim 1, wherein said method further comprises:

querying the server for information [required] to provide a third representation of the one or more remote records.

10. A method as recited in claim 1, wherein said method further comprises:

querying the server for information [required] to further populate the at least one record in order to effectively provide a third representation of the one or more remote records.

11. A computing system for retrieving digital media, wherein said computing system comprises:

a processing unit configured to [provide at least] *perform operations comprising*:

[means for] querying a server for database enumeration;

[means for] receiving a response to the database enumeration query that includes at least information about at least one digital media database coupled to the server, wherein the information about the at least one digital media database includes at least metadata about one or more remote records within the at least one digital media database, wherein the metadata effectively represents the one or more remote records as a first representation, and wherein the one or more remote records pertain to one or more of digital media, digital media metadata or media collection data;

[means for] querying the server for information [required] to populate one or more local records associated with the metadata after receiving the metadata;

[means for] receiving the information [required] to populate the one or more local records associated with the metadata in response to the querying of the server;

[means for] populating the one or more local records after receiving the information [required] to populate the one or more local records, thereby effectively providing one or more populated records based on the metadata associated with the one or more remote records, wherein the one or more populated records effectively represents the one or more remote records as a second representation;

*querying the remote database for information to update the local populated records at the local database;*

[means for] subsequently retrieving digital media associated with at least one of the populated records, wherein the one or more local records are part of a local database, and wherein said [means for] populating of the one or more local records operates to replicate at least a portion of the digital media database to the local database, and wherein the first representation provides a first level of detail with respect to the one or more remote records, wherein the second representation provides a second level of detail with respect to the one or more remote records, and wherein the second level of detail represents the one or more records in greater detail than the first level of detail.

12. A server for providing digital media to one or more devices, wherein said server comprises:

a processing unit configured to [provide at least] *perform operations comprising*:

[means for] receiving a query from a device for database enumeration;

[means for] sending the features of the server to the device in response to the query, the features including enumeration data about at least one digital media database, wherein the information about the at least one digital media database includes at least metadata about one or more records within the at least one digital media database, wherein the metadata can be used by the device to locally present one or more local records at the device as a first local presentation of at least a portion of the at least one digital media database, and wherein the records pertain to one or more of digital media, digital media metadata or media collection data;

[means for] receiving a [querying] *query* from the device for information [required] by the device to populate the one or more local records associated with the first local presentation;

[means for] sending the device information [required] to populate the one or more local records associated with the first local presentation, thereby allowing the device to populate the one or more local records after receiving the information [required] to populate the one or more local records in order to present the one or more local records as one or more populated records;

[means for] receiving a subsequent query from the device regarding at least one of the one or more populated records, *the subsequent query requesting information for updating the one or more populated records*; and

[means for] sending digital media associated with the at least one populated record after receiving the second query from the device, wherein the one or more local records are part of a local database provided at the device, and wherein population of the one or more local records at the device operates to replicate at least a portion of the digital media database to the local database, wherein the one or more populated records can be used to locally present the portion of the at least one digital media database at the device as a second local presentation, and wherein the first local presentation provides a first level of detail with respect to the one or more populated records, wherein the second local presentation provides a second level of detail with respect to the one or more populated records, and wherein the second level of detail represents the one or more records in greater detail than the first level of detail.

13. A computer readable storage medium including at least executable computer program code tangibly stored thereon for retrieving digital media, comprising:

computer program code for querying a server for database enumeration;

computer program code for receiving a response to the database enumeration query that includes at least information about at least one digital media database, wherein the information about the at least one digital media database includes at least metadata about one or more remote records within the at least one digital media database, wherein the metadata effectively represents the one or more remote records as a first representation, and wherein the one or more remote records pertain to one or more of digital media, digital media metadata or media collection data, the metadata being used to effectively provide a first representation of the one or more remote records;

computer program code for querying the server, based on the metadata, for information [required] to populate one or more of the local records associated with the metadata after receiving the metadata;

computer program code for receiving the information [required] to populate the one or more of the local records associated with the metadata in response to the querying of the server, computer program code for populating the one or more local records after receiving the information [required] to populate the one or more local records, thereby effectively providing one or more populated records based on the metadata associated with the one or more remote records, the one or more populated records being used to effectively provide a second representation of the one or more remote records; [and]

*computer code for querying the remote database for information to update the local populated records at the local database; and* computer program code for retrieving digital media associated with at least one of the populated records based on the populated one or more records, wherein the one or more local records are part of a local database, and wherein said computer program code for populating of the one or more local records operates to replicate at least a portion of the digital media database to the local database, and wherein the first representation provides a first level of detail with respect to the one or more remote records, wherein the second representation provides a second level of detail with respect to the one or more remote records, and wherein the second level of detail represents the one or more records in greater detail than the first level of detail.

14. A computer readable storage medium as recited in claim 13, wherein the remote records pertain to both digital media metadata and media collections and multiple queries are [required] *used* to populate the local records associated with the metadata.

15. A computer readable storage medium as recited in claim 13, wherein the first representation represents the one or more remote records in accordance with a first aspect of representation; and wherein the second representation represents the one or more remote records in accordance with a second aspect of representation that is different than the first aspect of representation.

16. A computer readable storage medium as recited in claim 13, wherein the computer readable medium further comprises:

computer program code for querying the server for information [required] to provide a third representation of one or more remote records.

17. A computer readable storage medium as recited in claim 13, wherein the computer readable medium further comprises:

computer program code for querying the server for information [required] to further populate the one or more local records in order to effectively provide a third representation of the one or more remote records.

18. A computer readable storage medium as recited in claim 13, further comprising:

computer program code for determining whether the digital media database has been updated since the one or more local records were populated from information provided by the digital media database.

19. A computer readable storage medium including at least executable computer program code tangibly stored thereon for providing digital media to one or more devices, wherein said computer readable medium comprises:

computer program code for receiving a query from a device for database enumeration;

computer program code for sending the features of the server to the device in response to the query, the features including enumeration data about at least one digital media database, wherein the information about the at least one digital media database includes at least metadata about one or more records within the at least one digital media database, wherein the metadata can be used by the device to locally present one or more local records at the device as a first local presentation of at least a portion of the at least one digital media database, and wherein the records pertain to one or more of digital media, digital media metadata or media collection data;

computer program code for receiving a querying from the device for information [required] by the device to populate the one or more local records associated with the first local presentation;

computer program code for sending the device information [required] to populate the one or more records associated with the first local presentation, thereby allowing the device to populate the one or more local records after receiving the information [required] to populate the one or more local records in order to present the one or more local records as one or more populated records;

computer program code for receiving a subsequent query from the device regarding at least one of the one or more populated records, *the subsequent query requesting information for updating the at least one of the one or more populated records*; and computer program code for sending digital media associated with the at least one populated record after receiving the second query from the device, wherein the one or more local records are part of a local database, and wherein the population of the one or more local records at the device operates to replicate at least a portion of the digital media database to the local database, wherein the one or more populated records can be used to locally present the portion of the at least one digital media database at the device as a second local presentation, and wherein the first local presentation provides a first level of detail with respect to the one or more remote records, wherein the second local presentation provides a second level of detail with respect to the one or more remote records, and wherein the second level of detail represents the one or more records in greater detail than the first level of detail.

20. A computing device comprising:

a processor;

memory, operably connected with the processor, wherein the processor is operable to perform instructions including:

connecting to a server, the server including media information;

querying the server for at least a portion of the media information;

receiving media information responsive to the query;

requesting at least one media item associated with the media information responsive to the query; and receiving the media item, wherein said querying includes a plurality of distinct queries to the server, and wherein said querying includes at least:

querying the server for database enumeration; and wherein said receiving of the media information includes a plurality of distinct responses to the queries, and wherein said receiving includes at least:

receiving a response to the database enumeration query that includes descriptive information on at least one remote database, the descriptive information including how much media is available from the at least one remote database or how many media collections are available from the at least one remote database or both, wherein said method further includes at least:

receiving the information [required] to populate the one or more of the local records associated with the metadata in response to the querying of the server;

populating the one or more local records after receiving the information [required] to populate the one or more local records, thereby effectively providing one or more populated records based on the metadata associated with the one or more remote records; [and]

*querying the server for information to update the one or more populated records;* retrieving digital media associated with at least one of the populated records based on the populated one or more records, wherein the one or more local records are part of a local database, and wherein by population of the one or more local records, at least a portion of the remote database is replicated to the local database, wherein the metadata being used to effectively provide a first representation of the one or more remote records, wherein the one or more populated records being used to effectively provide a second representation of the one or more remote records, and wherein the first representation provides a first level of detail with respect to the one or more remote records, wherein the second representation provides a second level of detail with respect to the one or more remote records, and wherein the second level of detail represents the one or more records in greater detail than the first level of detail.

21. The computing device of claim 20, wherein said querying includes at least:

querying the server for media collection enumeration, and wherein said receiving includes at least:

receiving a response to the media collection enumeration query that includes descriptive information on at least one media collection available from the at least one database.

22. The computing device of claim 20, wherein said querying includes at least:

querying the server for server capabilities, and wherein said receiving includes at least:

receiving a response to the server capabilities query that describes the server capabilities.

23. The computing device of claim 20, wherein querying the server for at least a portion of the media information includes at least a request for an enumeration of at least a portion of the media collections.

24. A computer readable storage medium as recited in claim 18, wherein said computer program code for determining whether the digital media database has been updated comprises:

computer program code for updating to a current revision indicator whenever the digital media database is modified;

computer program code for comparing the current revision indicator to a client-provided revision indicator, the client-provided revision indicator being provided with a request being received from a client, the request pertaining to the at least one digital media database and including a client-provided revision indicator, and computer program code for responding to the request with a response that includes at least an identification of the current revision indicator if the client-provided revision indicator did not match the current revision indicator.

*25. A method comprising:*

*querying a server for database enumeration to yield a first query, the database enumeration including information about a remote database coupled to the server, the information including how much media is available from the remote database or how many media collections are available from the remote database;*

*in response to the first query, receiving information about a remote database associated with the server, wherein the information includes metadata about one or more remote records in the remote database;*

*based on the information, providing a first representation of the one or more remote records in the remote database;*

*querying the server for content information to populate one or more local records to yield a second query, wherein the one or more local records are stored in a local database at a client device, and wherein the one or more local records to be populated are selected based on the first representation of the one or more remote records at the remote database;*

*in response to the second query, receiving the content information to populate the one or more local records stored in the local database;*

*querying the server for information to update the one or more local records at the local database;*

*based on the content information, populating the one or more local records in the local database to yield one or more populated records, wherein populating the one or more local records comprises replicating at least a portion of the remote database to the local database; and*

*providing, at the client device, a second representation of the one or more remote records based on the one or more populated records.*

*26. The method of claim 25, wherein the method is performed by a client-side media management system.*

*27. The method of claim 25, wherein:*

*the method is performed by a client-side media management system;*

*the query indicates the portion; and*

*the portion is at least partially based upon whether the client-side media management system has a limited memory, whereby the limited memory is not sufficient to store all the media information available from the server.*

*28. The method of claim 25, wherein:*

*the query indicates the portion; and*

*the portion is at least partially based upon providing a user with a customized experience.*

*29. The method of claim 25, wherein the server is a remotely located computing device that is connectable to the network.*

*30. A system comprising:*

*a processor; and*

*a memory having stored therein instructions which, when executed by the processor, cause the processor to perform operations comprising:*

*querying a server for database enumeration to yield a first query, the database enumeration including information about a remote database coupled to the server, the information including how much media is available from the remote database or how many media collections are available from the remote database;*

*in response to the first query, receiving information about a remote database associated with the server, wherein the information includes metadata about one or more remote records at the remote database;*

*based on the information, providing a first representation of the one or more remote records at the remote database;*

*querying the server for content information to populate one or more local records to yield a second query, wherein the one or more local records are stored in a local database, and wherein the one or more local records to be populated are selected based on the first representation of the one or more remote records at the remote database;*

*in response to the second query, receiving the content information to populate the one or more local records stored in the local database;*

*based on the content information, populating the one or more local records in the local database to yield one or more populated records, wherein populating the one or more local records comprises replicating at least a portion of the remote database to the local database;*

*querying the server for information to update the one or more populated records at the local database; and*

*providing, at the client device, a second representation of the one or more remote records based on the one or more populated records.*

*31. The computing device of claim 30, wherein the processor is operable to perform instructions including:*

*querying the server for server capabilities; and*

*receiving a response to the server capabilities query that describes the server.*

*32. The computing device of claim 30, wherein the processor is operable to perform instructions including:*

*querying the server for database enumeration; and*

*receiving a response to the database enumeration query that describes at least one database, the description including how much media is available from the at least one database or how many media collections are available from the at least one database or both.*

*33. The computing device of claim 30, wherein querying the server for at least a portion of the media information is a request for an enumeration of at least a portion of media collections.*

* * * * *